(12) United States Patent
Weaver, Jr. et al.

(10) Patent No.: US 9,828,540 B2
(45) Date of Patent: Nov. 28, 2017

(54) COMPOSITIONS FOR TREATING SUBTERRANEAN FORMATIONS

(71) Applicant: Halliburton Energy Services, Inc., Houston, TX (US)

(72) Inventors: Jimmie Dean Weaver, Jr., Duncan, OK (US); James William Ogle, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/023,285

(22) PCT Filed: Dec. 20, 2013

(86) PCT No.: PCT/US2013/077093
§ 371 (c)(1),
(2) Date: Mar. 18, 2016

(87) PCT Pub. No.: WO2015/094355
PCT Pub. Date: Jun. 25, 2015

(65) Prior Publication Data
US 2016/0230066 A1 Aug. 11, 2016

(51) Int. Cl.
*C09K 8/035* (2006.01)
*C09K 8/44* (2006.01)
(Continued)

(52) U.S. Cl.
CPC ............ *C09K 8/035* (2013.01); *C04B 24/38* (2013.01); *C08B 37/003* (2013.01); *C08B 37/0018* (2013.01); *C08B 37/0057* (2013.01); *C08B 37/0072* (2013.01); *C08B 37/0084* (2013.01); *C08B 37/0096* (2013.01); *C08L 5/00* (2013.01); *C08L 5/04* (2013.01); *C08L 5/08* (2013.01); *C09K 8/44* (2013.01); *C09K 8/50* (2013.01);
(Continued)

(58) Field of Classification Search
None
See application file for complete search history.

(56) References Cited

U.S. PATENT DOCUMENTS 4,508,629 A 4/1985 Borchardt
4,563,291 A 1/1986 Penny
(Continued)

FOREIGN PATENT DOCUMENTS

WO WO-2015094355 A1 6/2015

OTHER PUBLICATIONS

"International Application Serial No. PCT/US2013/077093, International Search Report dated Sep. 26, 2014", 3 pgs.
(Continued)

*Primary Examiner* — Jeffrey Washville
(74) *Attorney, Agent, or Firm* — Chamberlain Hrdlicka

(57) ABSTRACT

Various embodiments disclosed relate to treatment fluids comprising a compound of the formula (I): wherein $G_1$, $G_2$, $L_1$, $L_2$, $L_3$, q, and r are defined herein. Various other embodiments relates to methods of treating subterranean formations with such treatment fluids.

$$(G_1)_{\overline{q}}(L_1-L_3-L_2)_{\overline{(q+r)-1}}(G_2)_r \quad (I)$$

22 Claims, 2 Drawing Sheets

(51) Int. Cl.
- *C09K 8/62* (2006.01)
- *C09K 8/50* (2006.01)
- *C08B 37/00* (2006.01)
- *C08B 37/08* (2006.01)
- *C08L 5/00* (2006.01)
- *C08L 5/04* (2006.01)
- *C08L 5/08* (2006.01)
- *C04B 24/38* (2006.01)
- *C09K 8/60* (2006.01)
- *C09K 8/72* (2006.01)

(52) U.S. Cl.
CPC .................. *C09K 8/60* (2013.01); *C09K 8/62* (2013.01); *C09K 8/725* (2013.01); *C09K 2208/02* (2013.01)

(56) References Cited

U.S. PATENT DOCUMENTS

| | | | |
|---|---|---|---|
| 2003/0027787 A1* | 2/2003 | Couture | A61L 15/60 514/54 |
| 2006/0089265 A1 | 4/2006 | Hanes, Jr. et al. | |
| 2009/0075845 A1 | 3/2009 | Abad et al. | |
| 2012/0111570 A1 | 5/2012 | Smith et al. | |

OTHER PUBLICATIONS

"International Application Serial No. PCT/US2013/077093, Written Opinion dated Sep. 26, 2014", 7 pgs.

"International Application Serial No. PCT/US2013/077093, International Preliminary Report on Patentability dated Jun. 30, 2016", 9 pgs.

\* cited by examiner

COMPOSITIONS FOR TREATING SUBTERRANEAN FORMATIONS

PRIORITY APPLICATIONS

This application is a U.S. National Stage Filing under 35 U.S.C. §371 from International Application No. PCT/US2013/077093, filed on Dec. 20, 2013; and published as WO 2015/094355 on Jun. 25, 2015; which application and publication are incorporated herein by reference in their entirety.

BACKGROUND OF THE INVENTION

During the drilling, completion, and production phases of wells for petroleum, the downhole use of compositions having certain rheology (e.g., pseudoplastic rheology) is important for a wide variety of purposes. Such fluids can more effectively carry materials (e.g., proppants) to a desired location downhole. Similarly, such fluids can more effectively carry materials away from a drilling location downhole. Further, the use of such fluids during hydraulic fracturing generally results in larger, more dominant fractures. Such fluids are sometimes prepared using agents that may have an appreciable water solubility and toxicity, such that it could have a deleterious effect if ingested by organisms (e.g., humans) upon unintended exposure to such compounds.

SUMMARY OF THE INVENTION

Embodiments of the present invention provide, among other things, clean, non-damaging fluids comprising crosslinked polysaccharides. Specifically, embodiments of the present invention provide crosslinking agents that are useful for crosslinking polysaccharides that are not crosslinkable via current crosslinking technology (e.g., crosslinking technology that utilizes borate and zirconium ions). In some embodiments, the crosslinked product is stable at pH greater than 6.5. In other embodiments, the crosslinked product is not salt-sensitive. In still other embodiments, treatment fluids comprising the crosslinked product provide acceptable leakoff control and proppant transport comparable to that provided by guar, while causing little to no conductivity damage.

In various embodiments, the invention relates to a method comprising:
obtaining or providing a treatment fluid comprising a compound of the unit formula (I):

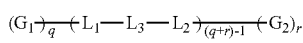
(I)

wherein:
$G_1$ and $G_2$ are each, independently, polysaccharides;
$L_1$ and $L_2$ are each, independently, linking groups;
$L_3$ is a linking group that is different than $L_1$ and $L_2$; and
q and r are each, independently, an integer from 1 to 5000; and
placing the treatment fluid in a subterranean formation.

In various other embodiments, the invention relates to a method comprising:
placing a treatment fluid comprising:
a compound of the formula (I):

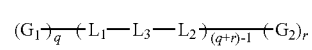
(I)

wherein:
$G_1$ and $G_2$ are each, independently, polysaccharides;
$L_1$ and $L_2$ are each, independently, linking groups;
$L_3$ is a linking group that is different than $L_1$ and $L_2$; and
q and r are each, independently, an integer from 1 to 5000;
in a subterranean formation.

In still other embodiments, the invention relates to a method comprising:
coating a surface with a composition comprising:

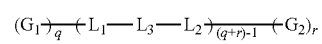
(I)

wherein:
$G_1$ and $G_2$ are each, independently, polysaccharides;
$L_1$ and $L_2$ are each, independently, curable resins;
$L_3$ is a linking group that is different than $L_1$ and $L_2$; and
q and r are each, independently, an integer from 1 to 5000; and
curing the curable resins.

In various embodiments, the invention relates to a system comprising:
a treatment fluid comprising:
a compound of the formula (I):

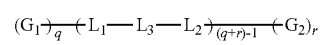
(I)

wherein:
$G_1$ and $G_2$ are each, independently, polysaccharides;
$L_1$ and $L_2$ are each, independently, linking groups;
$L_3$ is a linking group that is different than $L_1$ and $L_2$; and
q and r are each, independently, an integer from 1 to 5000; and
a subterranean formation comprising the treatment fluid.

In other embodiments, the invention relates to a treatment fluid for treating a subterranean formation, the treatment fluid comprising:
a compound of the formula (I):

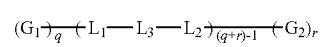
(I)

wherein:
$G_1$ and $G_2$ are each, independently, polysaccharides;
q and r are each, independently, an integer from 1 to 5000; and
$L_1$ and $L_2$ are each, independently, linking groups of the formula

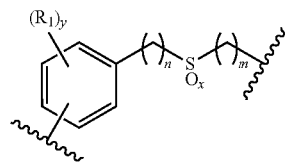

wherein each $R_1$ is, independently, a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; each y is, independently, 0, 1 or 2; each x is, independently, is 0, 1 or 2; each n is, independently, an integer from 1 to 10; and each m is, independently, an integer from 1 to 10, or

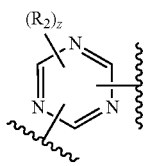

wherein each $R_2$ is, independently, a substituent selected from the group consisting of alkyl, alkenyl, alkynyl, aryl, halogen, hydroxyl, alkoxy, aryloxy, aralkyloxy, carboxyl (e.g., carboxylic acids, carboxylates, and carboxylate esters), thiol, alkyl and aryl sulfides, amino, nitrile, and nitro; and each z is, independently, 0, 1 or 2;

$L_3$ is a linking group of the formula

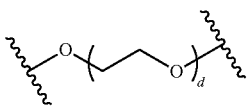

wherein d is an integer from 5 to 250.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
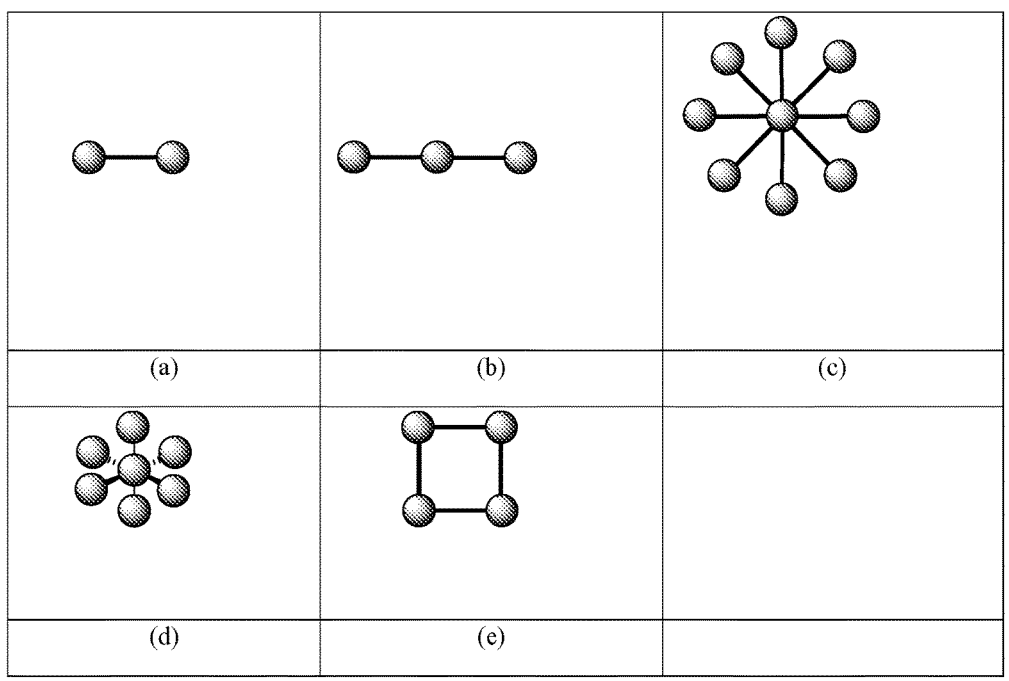
FIG. 1 is a schematic showing five non-limiting arrangements of the groups $G_1$, $G_2$, $L_1$, $L_2$, and $L_3$, where the spheres represent $G_1$ or $G_2$ and the lines/wedges/dashed wedges represent the groups $L_1$, $L_2$, and $L_3$, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

Embodiments of the present invention relate to treatment fluids. More specifically, embodiments of the present invention relate to treatment fluids comprising a compound having the unit formula (I):

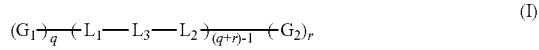

wherein:

$G_1$ and $G_2$ are each, independently, polysaccharides;

$L_1$ and $L_2$ are each, independently, linking groups;

$L_3$ is a linking group that is different than $L_1$ and $L_2$; and q and r are each, independently, an integer from 1 to 5000.

As used herein, the term "treatment fluids" refers generally to any fluid composition that may be used in a subterranean application in conjunction with a desired function and/or for a desired purpose. The term "treatment fluid" does not imply any particular action by the fluid or any component thereof. As a result, the treatment fluids can be inexpensive and simple to prepare, using either batch mixing or on-the-fly procedures. In some embodiments, the term "treatment fluids" includes, but is not limited to drilling fluids, stimulation fluids, clean-up fluids, fracturing fluids, spotting fluids, production fluids, completion fluids, remedial treatment fluids, abandonment fluids, acidizing fluids, cementing fluids, fluid control materials (e.g., water control materials), packing fluids or combinations thereof.

As used herein, the term "drilling fluid" refers to fluids, slurries, or muds used in drilling operations downhole, such as the formation of a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material, such as a polymer, that is in an at least partially uncured state.

As used herein, the term "fluid control material" (e.g., a "water control material") refers to a solid or liquid material that, by virtue of its viscosification in the flowpaths producing a fluid (e.g., water) alters, reduces or blocks the flow rates of such fluids into the wellbore, such that hydrophobic material can more easily travel to the surface and such that hydrophilic material (including water) can less easily travel to the surface. For example, a fluid control material can be used to treat a well to cause a proportion of a fluid produced, which may include water, to decrease and to cause the proportion of hydrocarbons produced to increase, such as by selectively causing the material to form a viscous plug between water-producing subterranean formations and the wellbore, while still allowing hydrocarbon-producing formations to maintain output.

In some embodiments, the fluid control material mitigates (e.g., reduces, stops or diverts) the flow of fluids (e.g., treatment fluids and water) through a portion of a subterranean formation that is penetrated by the well such that the flow of the fluid into high-permeability portions of the formation is mitigated. For example, in an injection well, it may be desirable to seal off high-permeability portions of a subterranean formation that would otherwise accept most of an injected treatment fluid. By sealing off the high-permeability portions of the subterranean formation, the injected treatment fluid may thus penetrate less permeable portions of the subterranean formation. In other embodiments, the fluid control material helps mitigate the production of undesired fluids (e.g., water) from a well by at least sealing off one or more permeable portions of a treated subterranean formation.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

In general, the treatment fluids of the present invention comprise, among other things, a compound having the unit formula (I):

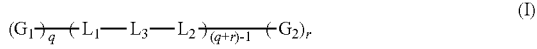  (I)

wherein:

$G_1$ and $G_2$ are each, independently, polysaccharides;
$L_1$ and $L_2$ are each, independently, linking groups;
$L_3$ is a linking group that is different than $L_1$ and $L_2$; and
q and r are each, independently, an integer from 1 to 5000. In some embodiments, q and r are each 1 such that the compound is a compound of the formula (Ia):

$G_1$-$L_1$-$L_3$-$L_2$-$G_2$ (Ia)

wherein $G_1$, $G_2$, $L_1$, $L_2$, and $L_3$ are defined herein.

The groups $G_1$, $G_2$, $L_1$, $L_2$, and $L_3$ can have any spatial arrangement. FIG. 1 is a schematic showing five non-limiting arrangements of the groups $G_1$, $G_2$, $L_1$, $L_2$, and $L_3$, where the spheres represent $G_1$ or $G_2$ and the lines/wedges/dashed wedges represent the groups $L_1$, $L_2$, and $L_3$. For example, panel (a) in FIG. 1 represents a compound of the formula (Ia). Panel (b) shows a linear arrangement where a group $G_1$/$G_2$ is flanked by two groups $L_1$-$L_3$-$L_2$. The groups $L_1$-$L_3$-$L_2$, in turn, each terminate at a group $G_1$/$G_2$. Panel (c) shows a "star" arrangement, where eight groups $G_1$/$G_2$ radiate from a single group $G_1$/$G_2$, where the groups that radiate are connected to the central group $G_1$/$G_2$ via "spokes" that represent the groups $L_1$-$L_3$-$L_2$. Finally, panel (d) shows an "octahedral" arrangement, where six groups $G_1$/$G_2$ radiate from a single group $G_1$/$G_2$, where the groups that aradiate are connected to the central group $G_1$/$G_2$ via "spokes" that represent the groups $L_1$-$L_3$-$L_2$. Combinations of the various arrangements shown in FIG. 1 are also contemplated. Other arrangements not shown in FIG. 1 are also contemplated.

Compounds of the unit formula (Ib) are also contemplated herein:

  (Ib)

wherein $G_1$, $G_2$, $L_1$, $L_2$, $L_3$, q, and r are defined herein. Panels (e) in FIG. 1 shows a "square" arrangement, where four groups $G_1$/$G_2$ represent the vertices of the square and each vertex is connected via the lines that represent the groups $L_1$-$L_3$-$L_2$.

Compounds of the unit formulae (Ic) and (Id) are also contemplated herein:

$(G_1)_q$-$(L_1$-$L_2)_{(q+r)-1}$-$(G_2)_r$ (Ic)

$(G_1)_q$-$(L_1$-$L_2)_{(q+r)}$-$(G_2)_r$ (Id)

wherein $G_1$, $G_2$, $L_1$, $L_2$, $L_3$, q, and r are defined herein.

$G_1$ and $G_2$ may be any suitable polysaccharide. In some embodiments $G_1$ is the same polysaccharide as $G_2$. In other embodiments, $G_1$ is a different polysaccharide than $G_2$.

$G_1$ and $G_2$ may be, for example, alginate, chitosan, curdlan, dextran, emulsan, a galactoglucopolysaccharide, gellan, glucuronan, N-acetyl-heparosan, hyaluronic acid, indican, kefiran, lentinan, levan, mauran, pullulan, scleroglucan, schizophyllan, stewartan, succinoglycan, xanthan gum, xylane, welan, starch, tamarind, tragacanth, guar gum, derivatized guar, gum ghatti, gum arabic, locust bean gum, diutan gum, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, carboxymethyl hydroxylpropyl guar or combinations thereof. In some embodiments, $G_1$ and/or $G_2$ are selected such that the compound of formula (I) and/or the treatment fluids containing the compound of the formula (I) exhibit pseudoplastic rheology. Materials that exhibit pseudoplastic rheology are characterized by viscosity that increases with application of low shear and decreases in response to application of high shear. This property results in materials that readily flow but are capable of suspending or stabilizing components (e.g., proppants). In some embodiments $G_1$ or $G_2$ may be xanthan gum, diutan gum, gum tragacanth or gum ghatti.

In some embodiments, $G_1$ is cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose or combinations thereof. In other embodiments, $G_2$ is cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose or combinations thereof. In still other embodiments, $G_1$ and $G_2$ are each, independently, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose or combinations thereof. In yet other embodiments, $G_1$ and $G_2$ are hydroxyethylcellulose or carboxymethyl cellulose.

The linking groups $L_1$ and $L_2$ can be any suitable linking groups. In some embodiments $L_1$ is the same linking group as $L_2$. In other embodiments, $L_1$ is a different linking group than $L_2$.

For example, $L_1$ or $L_2$ may be an optionally substituted $C_1$-$C_{20}$ hydrocarbylene group (e.g., an optionally substituted $C_3$-$C_{10}$ or an optionally substituted $C_3$-$C_8$ hydrocarbylene group), optionally interrupted by one or more atoms selected from the group consisting of O, $SO_x$ (wherein x is 0, 1 or 2), NH, N or combinations thereof.

Non-limiting examples of $C_1$-$C_{20}$ hydrocarbylene groups include optionally substituted $C_2$-$C_8$ alkylene groups, optionally interrupted by one or more atoms selected from the group consisting of O, $SO_x$ (wherein x is 0, 1 or 2), NH, N or combinations thereof; optionally substituted $C_3$-$C_8$ arylene groups, optionally interrupted by one or more atoms selected from the group consisting of O, $SO_x$ (wherein x is 0, 1 or 2), NH, N or combinations thereof; and optionally substituted $C_3$-$C_8$ heterocyclyl groups, optionally interrupted by one or more atoms selected from the group consisting of O, $SO_x$ (wherein x is 0, 1 or 2), NH, N or combinations thereof.

In some embodiments, the optionally substituted $C_3$-$C_8$ arylene group comprises an optionally substituted arylene-$SO_x$-group, wherein x is 0, 1 or 2. A non-limiting example of an optionally substituted $C_3$-$C_8$ arylene group comprising an arylene-$SO_x$-group includes the arylene-$SO_x$-group having the formula:

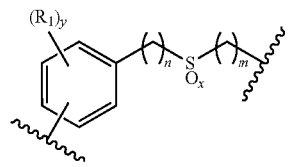

wherein $R_1$ is a substituent selected from the group consisting of alkyl (including haloalkyl, such as fluoroalkyl and perhaloalkyl, such as perfluoroalkyl), alkenyl, alkynyl, aryl, halogen (including fluoro), hydroxyl, alkoxy, aryloxy, aralkyloxy, carboxyl (e.g., carboxylic acids, carboxylates, and carboxylate esters), thiol, alkyl and aryl sulfides, amino, nitrile, and nitro; y is 0, 1 or 2; x is 0, 1 or 2; n is an integer from 1 to 10; and m is an integer from 1 to 10. In some embodiments, y is 0, n is 1, x is 2, and m is 2.

In some embodiments, the optionally substituted $C_3$-$C_8$ heterocyclyl group comprises an optionally substituted $C_3$-$C_8$ heterocyclyl group comprising one, two or three nitrogen atoms. In some embodiments, the optionally substituted $C_3$-$C_8$ heterocyclyl group comprises three nitrogen atoms. A non-limiting example of an optionally substituted $C_3$-$C_8$ heterocyclyl group comprising three nitrogen atoms includes an optionally substituted $C_3$-$C_8$ heterocyclyl group having the formula:

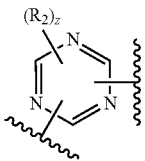

wherein $R_2$ is a substituent selected from the group consisting of alkyl, alkenyl, alkynyl, aryl, halogen, hydroxyl, alkoxy, aryloxy, aralkyloxy, carboxyl (e.g., carboxylic acids, carboxylates, and carboxylate esters), thiol, alkyl and aryl sulfides, amino, nitrile, and nitro. In some embodiments, $R_2$ is preferably nitrile or nitro, most preferably nitro. In some embodiments, z is 0. In other embodiments, z is 1 and $R_2$ is halogen, preferably Cl.

In some embodiments, $L_1$ and/or $L_2$ may comprise a curable resin. A non-limiting example of the resins contemplated herein for $L_1$ and/or $L_2$ include photocurable resins, such as acrylated epoxy resins, acrylated polyurethane, and acrylated polyester or combinations thereof.

The linking group $L_3$ can be any suitable linking group. In some embodiments, the linking group $L_3$ is a $C_{10}$-$C_{500}$ hydrocarbylene group (e.g., a $C_{10}$-$C_{100}$ hydrocarbylene group, a $C_{10}$ to $C_{50}$ hydrocarbylene group, a $C_{10}$-$C_{20}$ hydrocarbylene group and a $C_{10}$ hydrocarbylene group) optionally interrupted by one or more atoms selected from the group consisting of O, S, NH, or combinations thereof, and wherein the $C_{10}$-$C_{500}$ hydrocarbylene group is optionally substituted. In some embodiments, the $C_{10}$-$C_{500}$ hydrocarbylene group (e.g., a $C_{10}$-$C_{100}$ hydrocarbylene group, a $C_{10}$ to $C_{50}$ hydrocarbylene group, a $C_{10}$-$C_{20}$ hydrocarbylene group and a $C_{10}$ hydrocarbylene group) is optionally interrupted by one or more O atoms. In some embodiments, $L_3$ is a $C_{10}$-hydrocarbylene group optionally interrupted by one or more O atoms, wherein the $C_{10}$-hydrocarbylene group is optionally substituted. Non-limiting examples of the linking groups contemplated herein for $L_3$ are divalent groups and include linear and branched polyol radicals, such as polyvinyl alcohol radicals and polyethylene glycol radicals; dendritic polyols; polyester radicals; polyamide radicals; polycarbonate radicals; polyurethane radicals; linear and branched polyamine radicals, such as polyvinylamine, polyethyleneimine, putrescine, cadaverine, spermidine, and spermine; polyureas; polyvinyl formamide (PVF), and combinations thereof. Thus, for example, polyol radicals includes the divalent groups of the formulae $L_3^a$ and $L_3^b$, respectively:

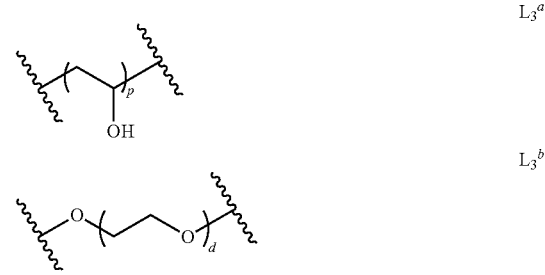

wherein the "wavy" lines indicate the point of attachment of $L_3^a$ and $L_3^b$ to $L_2$ and $L_1$; wherein p is an integer from 5 to 250 (e.g., from 5 to 50; from 5 to 25; from 5 to 10; or 5); and d is an integer from 5 to 250 (e.g., from 5 to 50; from 5 to 25; from 5 to 10; or 5).

In some embodiments, the linking group $L_3$ is a polyorganosiloxane. In some embodiments, the polyorganosiloxane has the formula —$[R'_2SiO]_s$—, wherein each R' is, independently, a $C_1$-$C_{10}$ hydrocarbylene group (e.g., methyl, phenyl or combinations thereof).

As used herein, the term "hydrocarbylene" broadly refers to a divalent functional group derived from a straight chain, branched, or cyclic hydrocarbon, such as an alkylene, alkenylene, alkynylene, arylene, cycloalkylene, divalent acyl, or a combination thereof. Hydrocarbylene groups can be unsubstituted or substituted, as defined herein.

The term "alkylene" as used herein refers to straight chain and branched divalent alkylene groups and cycloalkylene groups having from 1 to 40 carbon atoms, 1 to about 20 carbon atoms, 1 to 12 carbons or, in some embodiments, from 1 to 8 carbon atoms. Examples of straight chain alkylene groups include those with from 1 to 8 carbon atoms such as methylene (—$CH_2$—), ethylene (—$CH_2CH_2$—), n-propylene (—$CH_2CH_2CH_2$—), n-butylene (—$CH_2(CH_2)_2CH_2$—) and the like. Examples of branched alkylene groups include, but are not limited to, isopropylidene ($CH_2CH(CH_3)$) and the like. Examples of cycloalkylene groups include, but are not limited to, cyclopropylidene, cyclobutylidene, cyclopentylidene and the like. Alkylene groups can be unsubstituted or substituted, as defined herein.

The term "alkenylene" as used herein refers to straight and branched chain and cyclic divalent alkylene groups as defined herein, except that at least one double bond exists between two carbon atoms. Thus, alkenylene groups have from 2 to 40 carbon atoms, or 2 to about 20 carbon atoms, or 2 to 12 carbons or, in some embodiments, from 2 to 8 carbon atoms. Examples include, but are not limited to —CH=C($CH_3$)—, —C($CH_3$)=CH—, —C($CH_3$)=C($CH_3$)—, —C($CH_2CH_3$)=CH—, cyclohexenylene, cyclopentenylene, and the like. The double bonds may be in the E or Z configuration. Alkenylene groups can be unsubstituted or substituted, as defined herein.

The term "alkynylene" as used herein refers to straight and branched chain divalent alkylene groups, except that at least one triple bond exists between two carbon atoms. Thus, alkynylene groups have from 2 to 40 carbon atoms, 2 to about 20 carbon atoms, or from 2 to 12 carbons or, in some embodiments, from 2 to 8 carbon atoms. Examples include, but are not limited to —C≡C—, —$CH_2$C≡CH, —CH$_2$C≡C—, and the like. Alkynylene groups can be unsubstituted or substituted, as defined herein.

The term "acyl" as used herein refers to a group containing a carbonyl moiety wherein the group is bonded via the carbonyl carbon atom. The carbonyl carbon atom is also bonded to another carbon atom, which can be part of an alkylene, alkenylene, alkynylene, arylene, cycloalkylene group or the like. An acyl group can include 0 to about 12-20 or 12-40 additional carbon atoms bonded to the carbonyl group. An acyl group can include double (e.g., an acryloyl group) or triple bonds within the meaning herein. An acyl group can also include heteroatoms within the meaning here.

The term "arylene" as used herein refers to divalent cyclic aromatic hydrocarbons that do not contain heteroatoms in the ring. Thus arylene groups include, but are not limited to, phenylene, biphenylene, and the like. In some embodiments, arylene groups contain about 6 to about 14 carbons in the ring portions of the groups. Arylene groups can be unsubstituted or substituted, as defined herein. Representative substituted arylene groups can be mono-substituted or substituted more than once.

The term "heterocyclyl" as used herein refers to mono- and divalent aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-membered ring with two carbon atoms and three heteroatoms, a 6-membered ring with two carbon atoms and four heteroatoms and so forth. Likewise a C$_4$-heterocyclyl can be a 5-membered ring with one heteroatom, a 6-membered ring with two heteroatoms, and so forth. The number of carbon atoms plus the number of heteroatoms sums up to equal the total number of ring atoms. A heterocyclyl ring can also include one or more double bonds. A heteroarylene ring is an embodiment of a heterocyclyl group. The phrase "heterocyclyl group" includes fused ring species including those that include fused aromatic and non-aromatic groups. Heterocyclyl groups can be unsubstituted or substituted, as defined herein.

As used herein, the term "substituted" broadly refers to a group (e.g., an arylene group, a heterocycyl group, an alkylene group, an alkenylene group, a cycloalkylene) in which one or more hydrogen atoms contained therein are replaced by one or more "functional groups" or "substituents." Examples of substituents or functional groups include, but are not limited to, alkyl, alkenyl, alkynyl, aryl, halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents include F, Cl, Br, I, OR, OC(O)N(R')$_2$, CN, NO, NO$_2$, ONO$_2$, azido, CF$_3$, OCF$_3$, R', =O (oxo), =S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, cycloalkyl, aryl, aralkyl, heterocyclyl, heteroaryl, or heteroarylalkyl or two R groups bonded to a nitrogen atom or to adjacent nitrogen atoms can, together with the nitrogen atom or atoms, form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "cycloalkyl" as used herein refers to cyclic alkyl groups including, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups including, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

As used herein, the term "amino group" or "amine group" broadly refers to a substituent of the form —$NH_2$, —$NHR_{13}$, —$N(R_{13})_2$, —$N(R_{13})_3^+$, wherein each $R_{13}$ is independently selected from the group consisting of hydrogen, alkyl, aryl, and arylalkyl, and protonated forms of each, except for —$N(R_{13})_3^+$, which cannot be protonated; or to the group —$N(R_{13})$— and protonated forms thereof. Accordingly, any compound substituted with an amino group can be viewed as an amine. An "amino group" within the meaning herein can be a primary, secondary, tertiary or quaternary amino group, preferably a primary or a secondary amino group.

As used herein, the term "arylalkyl" broadly refers to alkyl groups as defined herein wherein a hydrogen or a carbon bond of the alkyl group is replaced with a bond to an aryl group as defined herein.

As used herein, the term "heteroarylalkyl" broadly refers to alkyl groups as defined herein wherein a hydrogen or a carbon bond of the alkyl group is replaced with a bond to a heteroaryl group as defined herein.

In some embodiments, the treatment fluid can comprise the compound of the unit formula (I) or the components used to form the compound of the unit formula (I). Thus, in one embodiment, the compound of the unit formula (I) can be prepared above-surface and can be used to prepare the treatment fluid; or the compound of the unit formula (I) can be formed in a subterranean formation downhole; or a combination thereof.

The components used to form the compound of unit formula (I) include, but are not limited to, compounds of the formulae (II)-(IX):

$$G_1\text{-}R_3 \quad (II)$$

$$G_2\text{-}R_4 \quad (III)$$

$$R_5\text{-}L_1\text{-}R_6 \quad (IV)$$

$$R_7\text{-}L_2\text{-}R_8 \quad (V)$$

$$R_9\text{-}L_3\text{-}R_{10} \quad (VI)$$

$$G_1\text{-}L_1\text{-}R_6 \quad (VII)$$

$$G_2\text{-}L_2\text{-}R_8 \quad (VIII)$$

$$R_{11}\text{-}L_1\text{-}L_3\text{-}L_2\text{-}R_{12} \quad (IX)$$

wherein $R_3$-$R_{12}$ represent reactive groups. For example, $R_3$ and $R_4$ represent one or more reactive groups that may be present on the polysaccharide represented by $G_1$ and $G_2$, respectively. Examples of reactive groups represented by $R_3$ and $R_4$ include, but are not limited to, hydroxyl groups, amine groups, aldehyde groups, carboxylic acid groups, and ester groups. In some embodiments $R_3$ and $R_4$ are the same. In other embodiments, $R_3$ and $R_4$ are different from each other.

With the benefit of this disclosure, other compounds for the formation of the compound of unit formula (I), in addition to the compounds of the formulae (II)-(IX), will be readily apparent to those of skill in the art.

$R_5$-$R_8$, $R_{11}$, and $R_{12}$ represent reactive groups that may be present on the linking groups $L_1$ and $L_2$, respectively. Examples of reactive groups represented by $R_5$-$R_8$, $R_{11}$, and $R_{12}$ include, but are not limited to, hydroxyl groups, amine groups, aldehyde groups, carboxylic acid groups, ester groups, halogens (e.g., chlorine and bromine), sulfonic ester groups (e.g., trifluormethane sulfonyl-O— and p-tolylsulfonyl-O—), vinyl sulfone groups, epoxy groups, and sulfatosulfone groups (e.g., —$SO_2$—$CH_2CH_2$—$OSO_3H$). In some embodiments $R_5$-$R_8$, $R_{11}$, and $R_{12}$ are the same. In other embodiments $R_5$-$R_8$, $R_{11}$, and $R_{12}$ are different from each other. In other embodiments, $R_5$ and $R_6$ are the same, but $R_7$ and $R_8$ are different from each other. In other embodiments, $R_7$ and $R_8$ are the same, but $R_5$ and $R_6$ are different from each other. And in still other embodiments, $R_5$ and $R_7$ are the same, but $R_6$ and $R_8$ are different from each other.

$R_9$ and $R_{10}$ represent reactive groups that may be present on the linking group $L_3$. Examples of reactive groups represented by $R_9$ and $R_{10}$ include, but are not limited to, hydroxyl groups, amine groups, aldehyde groups, carboxylic acid groups, epoxy groups, and ester groups. In some embodiments $R_9$ and $R_{10}$ are the same. In other embodiments, $R_9$ and $R_{10}$ are different from each other.

In some embodiments, the reactive group $R_3$-$R_{12}$ can be a boronic acid-containing aryl group; that is the group:

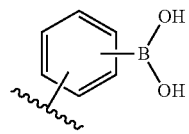

where the "wavy" line indicates the point of attachment to, e.g., to the linking group $L_3$.

Those of ordinary skill in the art will recognize that the reactive groups $R_3$-$R_{12}$ should be "matched" so that, e.g., a compound of the formula (VII) can react with a compound of the formula (VI) to form one or more compounds of the formulae (Xa), (Xb), and/or (Xc); or a compound of the formula (II) can react with a compound of the formula (IX) to form a compound of the formula (Ia) as shown in Scheme 1, below.

Scheme 1

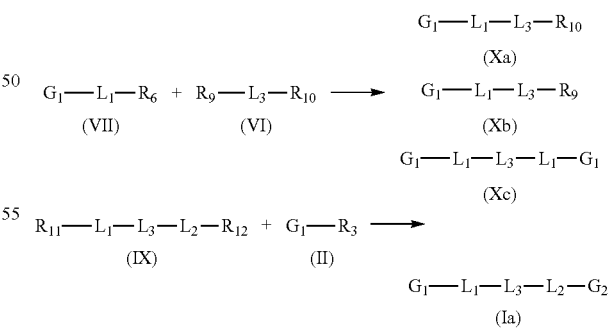

Those with skill in the art will recognize that the compound of the formula (Xc) may be used in treatment fluids of the present invention. The compound of formula (Xc) falls under formula (Ia) when $G_2$ and $L_2$ are the same as $G_1$ and $L_1$, respectively. In some embodiments, the compound of the formula (Xc) will be the major product of the reaction of the compounds of the formulae (VII) and (VI), with the compounds of the formulae (Xa) and (Xb) as minor products. In other embodiments, the compound of the formula (Xa) or the formula (Xb) will be the major product of the reaction of the compounds of the formula (VII) and (VI).

The compounds of the formulae (Xa) and (Xb) may be isolated and may be reacted with, e.g., a compound of the formula (VIII) to form a compound of the formula (Ia), as shown in Scheme 2, below, where only the reaction of the compound of the formula (Xa) with a compound of the formula (VIII) is shown.

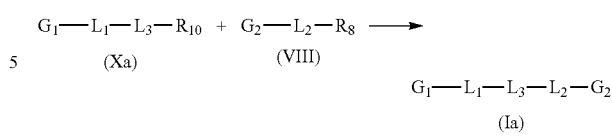

Two specific, non-limiting examples of the reaction shown in Scheme 2 to give a compound of the formula (Ia) are shown in Scheme 3 below.

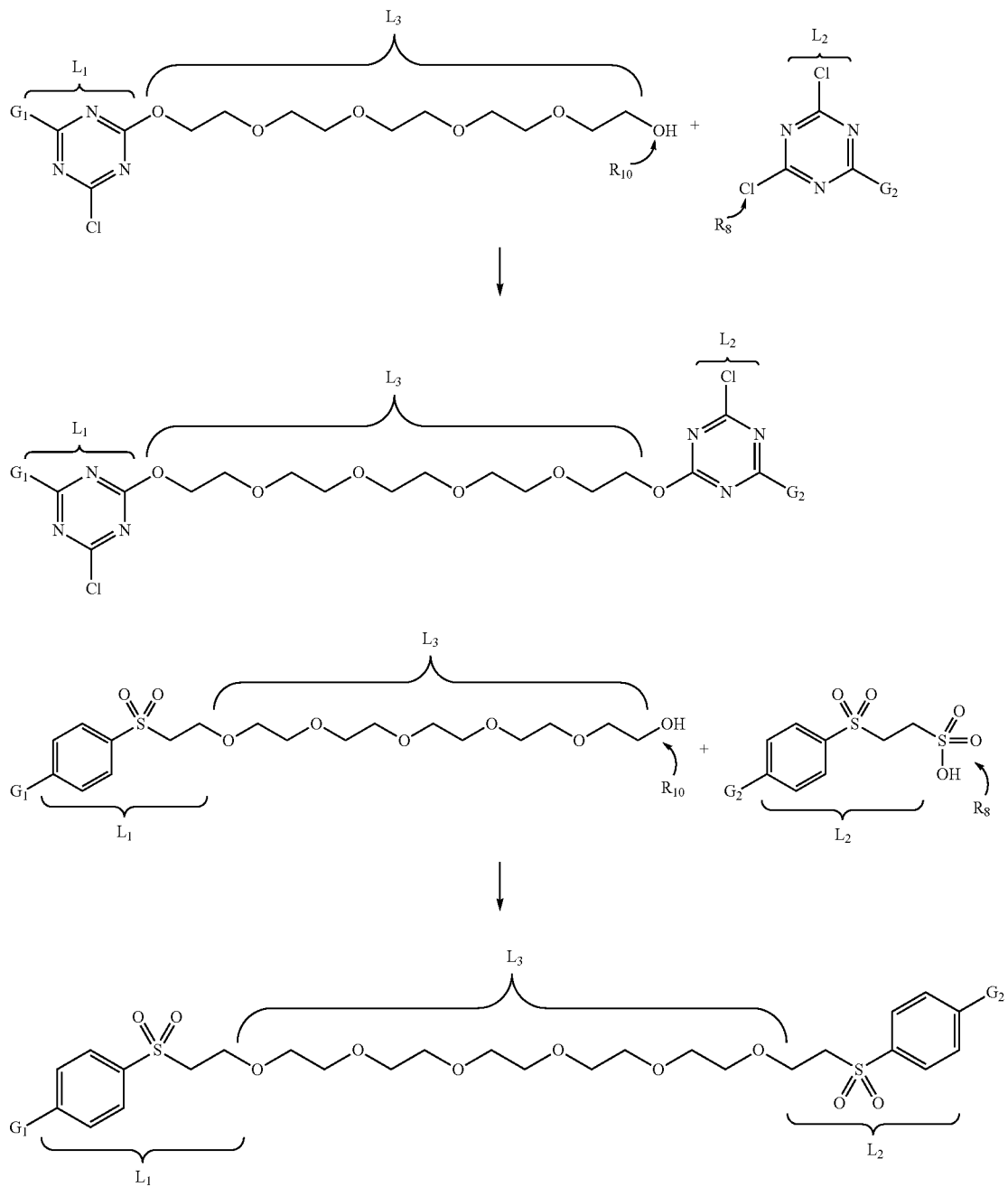

One specific, non-limiting example of the reaction between a compound of the formula (IX) and a compound of the formula (II) to give a compound of the formula (Ia) is shown in Scheme 4 below.
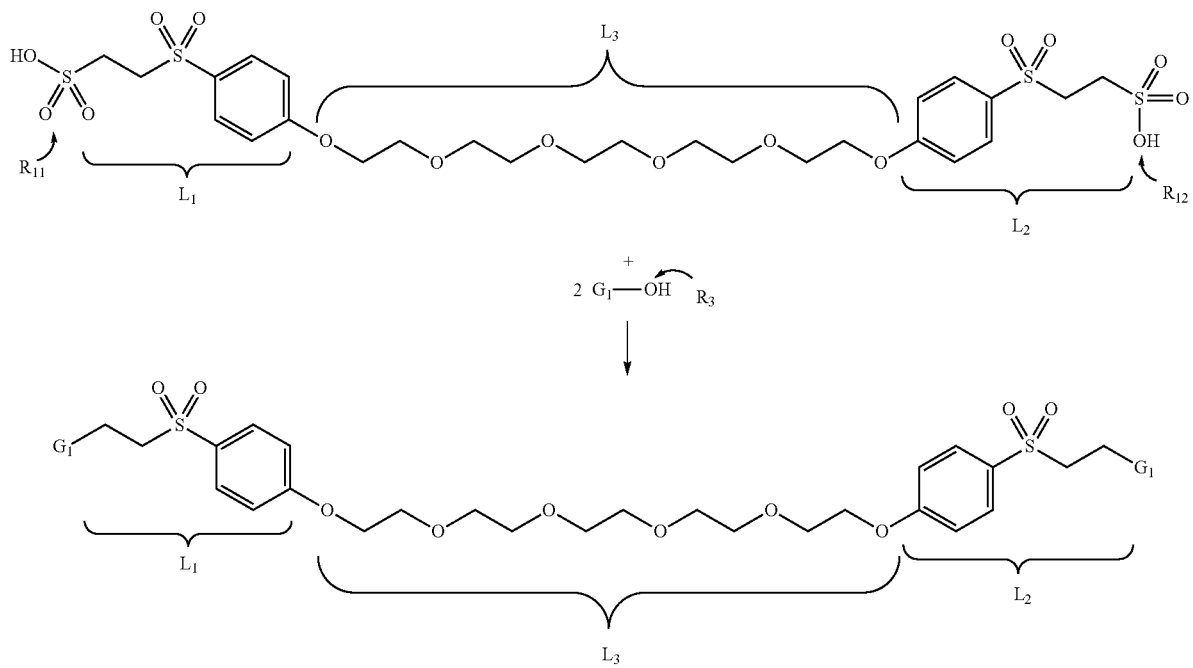
Scheme 4
Another reaction contemplated herein includes the reaction illustrated in Scheme 5 below.
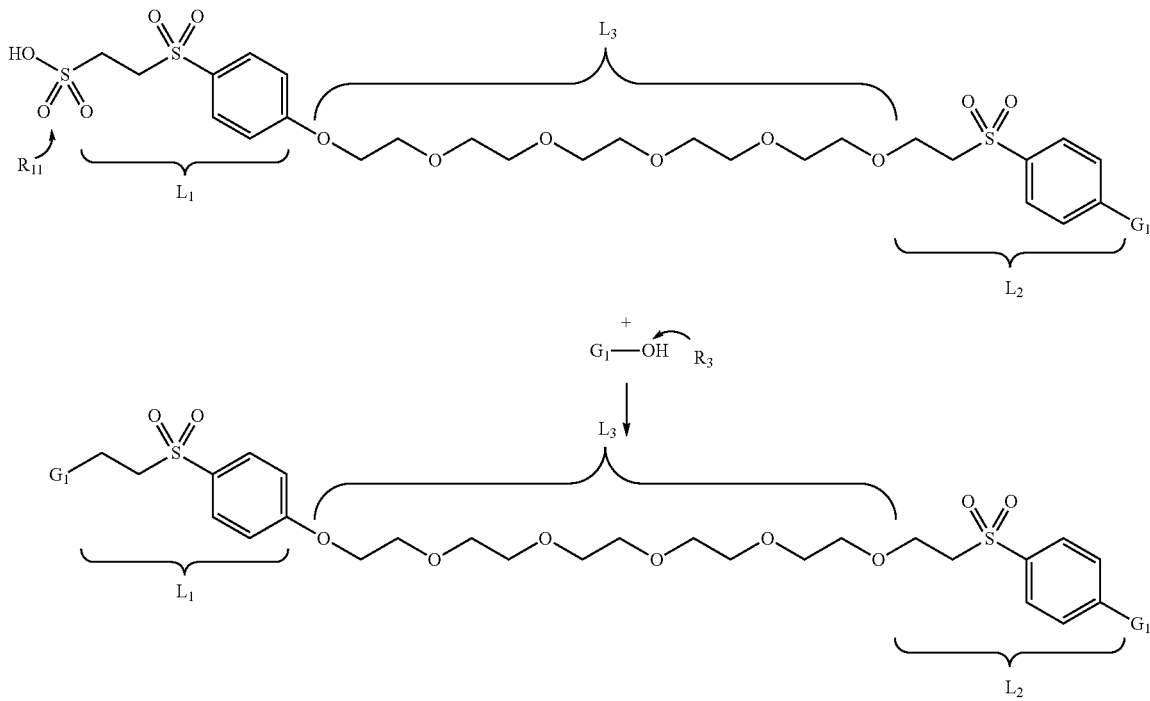
Scheme 5

The reactions illustrated in Schemes 1-5 may be conducted under any suitable conditions that will lead to the formation of the compound of the unit formula (I). In some embodiments, the reactions are conducted under alkaline conditions at a pH of from about 8 to about 11 or higher. Under such conditions, the hydroxyl group $R_{10}$ on, e.g., a polyethylene glycol linker $L_3$ in Scheme 3 or one or more hydroxyl groups on the polysaccharide in Schemes 4 and 5, will be deprotonated such that the resulting alkoxide can react more readily with reactive groups such as $R_8$, $R_{11}$, and $R_{12}$. The alkaline conditions can be created using any suitable base including KOH, NaOH, $K_2CO_3$, $NaHCO_3$, $Na_2CO_3$, acetates (e.g., sodium acetate) and the like.

In some embodiments, when it is desired to form the compound of unit formula (I) in a subterranean formation downhole, certain additives (e.g., a suitable base, in solution) may be added, at the appropriate time, to the treatment fluids of the present invention to promote or accelerate the formation of the compound of unit formula (I). The addition of these additives may be timed so that so that the treatment fluids may be used in a wider range of applications than would be otherwise possible.

The time required for the formation of the compound of formula (I) can vary widely. This length of time may vary, depending on a number of factors, including the types of components used to form the compound of unit formula (I), the concentrations of components used, the pH, the temperature, and a variety of other factors. Delaying the formation of the compound of unit formula (I) may be desirable to allow, among other things, pumping of the composition to its desired location.

The compound of the unit formula (I) or the components used to form the compound of the unit formula (I) may be provided or used in any suitable form. For instance, the compound of the unit formula (I) or the components used to form the compound of the unit formula (I) may be used in any form, for example as an aqueous solution, a gel, an emulsion, a suspension, or as a solid. In some embodiments, the compound of the unit formula (I) or the components used to form the compound of the unit formula (I) may be dissolved, suspended, or emulsified in a liquid such as water.

In some embodiments, once the compound of the unit formula (I) is formed, the groups $G_1$ or $G_2$ may be cross-linked, either intermolecularly or intramolecularly using any crosslinking agent known in the art. Examples of suitable crosslinking agents include, but are not limited to, borate ions and zirconium ions. These ions may be provided by providing any compound that is capable of producing one or more of these ions. Examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like. The crosslinking agent, when present, may be present in the treatment fluid in an amount in the range of from about 0.01 percent to about 1.5 percent by weight of the treatment fluid, e.g., 0.1 percent to about 0.5 percent by weight, from about 0.15 percent to about 0.35 percent by weight, from about 0.2 percent to about 0.3 percent by weight or from about 0.15 to about 0.3 percent by weight of the treatment fluid.

In some embodiments, the treatment fluids of the present invention may comprise one or more salts. Representative salts include the chloride, bromide, acetate, and formate salts of potassium, sodium, calcium, magnesium, zinc and ammonium ions.

In some embodiments, the treatment fluids of the embodiments of the present invention comprise an aqueous base fluid. The aqueous base fluid comprises one or more aqueous fluids. For example, the aqueous base fluid may include, but is not limited to, seawater, produced water, flowback water, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the embodiments of the present invention. In certain embodiments, the density of the aqueous base fluid can be increased, among other purposes, to provide additional particle transport and suspension in the treatment fluids of the embodiments of the present invention.

In certain embodiments, the pH of the aqueous base fluid may be adjusted (e.g., by a buffer or other pH adjusting agent) prior to the preparation of the treatment fluids to, among other things, modulate the viscosity of the treatment fluid. The pH may be adjusted to a specific level, which may depend on, among other factors, the chemical composition of the compounds of the unit formula (I) or the compounds used to form the compound of the unit formula (I). In general, the pH of the fluid may be about 8 or more (e.g., from about 8 to about 14, from about 9 to about 14, from about 8 to about 11, from about 9 to about 11, or from about 10 to about 14). Suitable pH adjusting agents include any compounds capable of altering the pH of the treatment fluid. Examples of such compounds that may be used include, but are not limited to, sodium hydroxide, potassium hydroxide, lithium hydroxide, various carbonates, bicarbonates, phosphates, hydrogen phosphates, dihydrogen phosphates any combination thereof, or any other commonly used pH control agent that does not adversely affect the performance of the treatment fluids of the present invention. When used, the pH-adjusting compound is generally present in a aqueous fluid of the present invention in an amount in the range of from about 0.5% to about 10% by weight of the aqueous fluid therein. In another embodiment, the pH-adjusting compound is generally present in a treatment fluid of the present invention in an amount in the range of from about 0.01% to about 0.3% by weight of the aqueous fluid therein. One of ordinary skill in the art, with the benefit of this disclosure, will recognize if/when such pH adjustments are appropriate.

The treatment fluids of the embodiments of the present invention comprise a compound of the unit formula (I). The compound of the unit formula (I) may be present in the treatment fluid in an amount in the range of from about 0.01 percent to about 15 percent by weight of the treatment fluid, e.g., from about 0.005 percent to about 5 percent by weight or from about 0.1 percent to about 3 percent by weight of the treatment fluid.

In some embodiments, the treatment fluids of the present invention may comprise particulates, including, but not limited to proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh or smaller on the U.S. Sieve Series; however, in certain circumstances, other sizes may be desired and will be entirely suitable for practice of the present invention. In particular embodiments, preferred particulates size distribution ranges are one or more of 6/12, 8/16, 10/30, 12/20, 16/30, 20/40, 30/50, 40/60, 40/70, or 50/70 mesh. Also, mixtures of particulates may be used having different particle size distribution ranges to enhance the packed volume of the proppant particulates within the fracture. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The treatment fluids of the embodiments of the present invention may include one or more of a variety of well-known additives which do not adversely react with the treatment fluids. Examples of additives include, but are not limited to, gel stabilizers (e.g., Gel-Sta™ from Halliburton), fluid loss control additives, acids, corrosion inhibitors, catalysts, clay stabilizers, biocides, bactericides, friction reducers, gas, surfactants, solubilizers, pH adjusting agents, and the like. For example, in some embodiments, it may be desired to foam a treatment fluid of the embodiments of the present invention using a gas, such as air, nitrogen, or carbon dioxide. Those of ordinary skill in the art, with the benefit of this disclosure, will be able to determine the appropriate additives for a particular application.

The treatment fluids of the embodiments of the present invention can be prepared by dissolving or suspending one or more of the components in an aqueous fluid; combining one or more of the components in solid form, then adding an aqueous fluid; or dissolving one or more of the components in water or water-miscible solvent and adding, to the solution, one or more of the components in solid form. Additional components may be added into the treatment fluid.

Various embodiments of the present invention provide a method of treating a subterranean formation. The method includes obtaining or providing a treatment fluid comprising a compound of the unit formula (I). The obtaining or providing of the treatment fluid can occur at any suitable time and at any suitable location. For example, the obtaining or providing of the treatment fluid can occur above the surface. The obtaining or providing of the treatment fluid can also occur downhole. The method also includes placing the treatment fluid in a subterranean formation. The placing of the treatment fluid in the subterranean formation can include contacting the treatment fluid and any suitable part of the subterranean formation. The subterranean formation can be any suitable subterranean formation. In some examples, the placing of the treatment fluid in the subterranean formation includes contacting the treatment fluid with or placing the treatment fluid in at least one of a fracture, at least a part of an area surrounding a fracture, a flow pathway, an area surrounding a flow pathway, and an area desired to be fractured. The placing of the treatment fluid in the subterranean formation can be any suitable placing and can include any suitable contacting between the subterranean formation and the treatment fluid. The placing of the treatment fluid in the subterranean formation can include at least partially depositing the treatment fluid in a fracture, flow pathway, or area surrounding the same.

In some embodiments, the method can be a method of drilling. The method can further include performing a drilling operation after placing the treatment fluid in the subterranean formation. The treatment fluid can include a drilling fluid; the treatment fluid can be a drilling fluid. The drilling fluid can be an aqueous drilling fluid. Obtaining or providing the treatment fluid can include obtaining or providing a drilling fluid, and combining the compound of the unit formula (I) with the drilling fluid, to provide the treatment fluid. Placing the treatment fluid in the subterranean formation can include pumping the treatment fluid into a drill string disposed in a wellbore, the drill string including a drill bit at a downhole end of the drill string.

The method can be a method of hydraulic fracturing, such as a method of hydraulic fracturing to generate a fracture or flow pathway. The treatment fluid can include a fracturing fluid; the treatment fluid can be a fracturing fluid. The fracturing fluid can be an aqueous fracturing fluid, having a continuous phase that is aqueous. The treatment fluid can further include a proppant, a resin-coated proppant, or a combination thereof. Obtaining or providing the treatment fluid can include obtaining or providing a fracturing fluid and combining the compound of the unit formula (I) with the fracturing fluid, to provide the treatment fluid. Placing the treatment fluid in the subterranean formation can include pumping the treatment fluid into the subterranean formation.

The placing of the treatment fluid in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of the treatment fluid only with no proppant, such as to begin to break into an area and initiate fractures to produce sufficient penetration and width to allow proppant-laden later stages to enter), or a slurry stage of the fracturing (e.g., treatment fluid with proppant). The method can include performing a stimulation treatment at least one of before, during, and after placing the treatment fluid in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the treatment fluid is placed or contacted, or the treatment fluid is placed or contacted to an area surrounding the generated fracture or flow pathway.

In some embodiments, the treatment fluid including a compound of the unit formula (I) can include any suitable amount of any suitable material used in a downhole fluid. For example, the treatment fluid can include water, saline, aqueous base, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, corrosion inhibitors, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the treatment fluid can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the tradename TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a bridging agent which includes a sized calcium carbonate (ground marble); BAROID®, a weighting agent that includes barium sulfate; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a lost circulation material including a polymer; HYDRO-PLUG®, a lost circulation material including a Portland cement formulation; lime, which can provide alkalinity and can activate certain emulsifiers; and calcium chloride, which can provide salinity.

Optionally, other additives can be added to a cement or kiln dust-containing treatment fluid of embodiments of the present invention as deemed appropriate by one skilled in the art, with the benefit of this disclosure. Any optional ingredient listed in this paragraph can be either present or not present in the treatment fluid. For example, the treatment fluid can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In an embodiment, a method of using the treatment fluid of the embodiments of the present invention comprises obtaining or providing a treatment fluid comprising a compound of the unit formula (I); and placing (e.g., injecting, pumping, flowing or combinations thereof) the treatment fluid in a subterranean formation. The treatment fluid of the embodiments of the present invention may be used for any treatment or subterranean operation known to one of ordinary skill in the art.

In an embodiment, a method of using the treatment fluid of the embodiments of the present invention comprises placing a treatment fluid comprising a compound of the unit formula (I) in a subterranean formation.

In various embodiments, the present invention provides a system comprising a treatment fluid comprising: a compound of the unit formula (I); and a subterranean formation comprising the treatment fluid. The system can be any suitable system that can include the use of the treatment fluid described herein in a subterranean formation, or that can include performance of a method for using the treatment fluid described herein.

In various embodiments, the present invention provides a method comprising coating a surface with a composition comprising a compound of the unit formula (I):

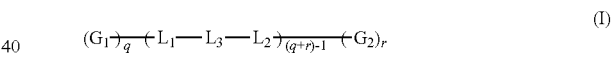

wherein:
$G_1$ and $G_2$ are each, independently, polysaccharides;
$L_1$ and $L_2$ are each, independently, curable resins;
$L_3$ is a linking group that is different than $L_1$ and $L_2$; and
q and r are each, independently, an integer from 1 to 5000; and
curing the curable resins. In some embodiments, the curable resin comprises a photocurable resin and the curing comprises curing with ultraviolet light. Surfaces that can be coated with a coating composition comprising the compound of the formula (I) include the surfaces of screens and filters that are used in subterranean operations.

In various other embodiments, the present invention provides a treatment fluid for treating a subterranean formation, the composition comprising a compound of the unit formula (I):

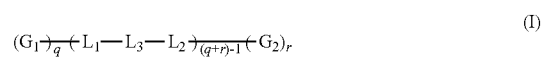

wherein:
$G_1$ and $G_2$ are each, independently, polysaccharides;
q and r are each, independently, an integer from 1 to 5000; and $L_1$ and $L_2$ are each, independently, linking groups of the formula

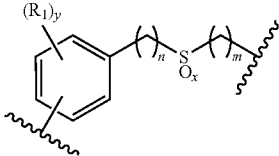

wherein each $R_1$ is, independently, a substituent selected from the group consisting of alkyl (including haloalkyl, such as fluoroalkyl and perhaloalkyl, such as perfluoroalkyl), alkenyl, alkynyl, aryl, halogen (including fluoro), hydroxyl, alkoxy, aryloxy, aralkyloxy, carboxyl (e.g., carboxylic acids, carboxylates, and carboxylate esters), thiol, alkyl and aryl sulfides, amino, nitrile, and nitro; each y is, independently, 0, 1 or 2; each x is, independently, is 0, 1 or 2; each n is, independently, an integer from 1 to 10; and each m is, independently, an integer from 1 to 10, or

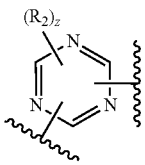

wherein each $R_2$ is, independently, a substituent selected from the group consisting of alkyl, alkenyl, alkynyl, aryl, halogen, hydroxyl, alkoxy, aryloxy, aralkyloxy, carboxyl (e.g., carboxylic acids, carboxylates, and carboxylate esters), thiol, alkyl and aryl sulfides, amino, nitrile, and nitro; and each z is, independently, 0, 1 or 2;

$L_3$ is a linking group of the formula

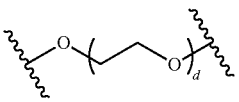

wherein d is an integer from 5 to 250. In some embodiments, $L_1$ and $L_2$ are each, independently, linking groups of the formula:

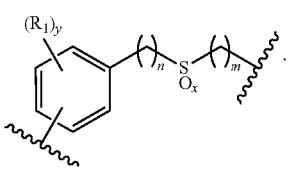

In other embodiments, $L_1$ and $L_2$ are each, independently, linking groups of the formula:

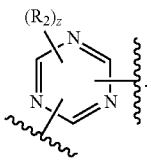

Figure 2:
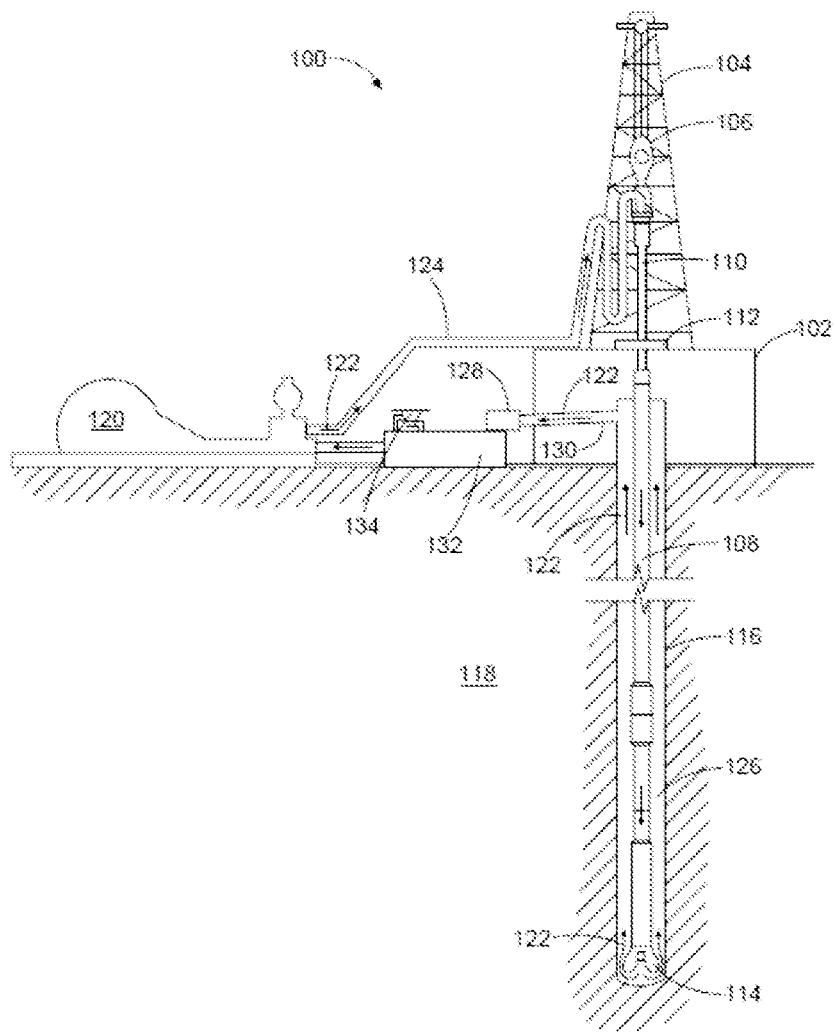
FIG. 2 is a drilling assembly, in accordance with various embodiments.

The treatment fluids disclosed herein may directly or indirectly affect one or more components or pieces of equipment associated with the preparation, delivery, recapture, recycling, reuse, and/or disposal of the disclosed treatment fluids. For example, and with reference to FIG. 2, the disclosed treatment fluids may directly or indirectly affect one or more components or pieces of equipment associated with a wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates treatment fluid 122 through a feed pipe 124 and to the kelly 110, which conveys the treatment fluid 122 downhole through the interior of the drill string 108 and through one or more orifices in the drill bit 114. The treatment fluid 122 is then circulated back to the surface via an annulus 126 defined between the drill string 108 and the walls of the wellbore 116. At the surface, the recirculated or spent treatment fluid 122 exits the annulus 126 and may be conveyed to one or more fluid processing unit(s) 128 via an interconnecting flow line 130. After passing through the fluid processing unit(s) 128, a "cleaned" treatment fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The treatment fluid 122 may be mixed via a mixing hopper 134 communicably coupled to or otherwise in fluid communication with the retention pit 132. The mixing hopper 134 may include, but is not limited to, mixers and related mixing equipment known to those skilled in the art. In some embodiments, there can be more than one retention pit 132, such as multiple retention pits 132 in series. The retention pit 132 may be representative of one or more fluid storage facilities and/or units where the treatment fluid may be stored, reconditioned, and/or regulated until it is ready for use or reuse.

As mentioned above, the treatment fluid may directly or indirectly affect the components and equipment of the drilling assembly 100. For example, the treatment fluid may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the treatment fluid.

The treatment fluid may directly or indirectly affect the pump 120, which representatively includes any conduits, pipelines, trucks, tubulars, and/or pipes used to fluidically convey the treatment fluid downhole, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The treatment fluid may also directly or indirectly affect the mixing hopper 134 and the retention pit 132 and their assorted variations.

The treatment fluid may also directly or indirectly affect the various downhole equipment and tools that may come into contact with the treatment fluid such as, but not limited to, the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The treatment fluid may also directly or indirectly affect any downhole heat exchangers, valves and corresponding actuation devices, tool seals, packers and other wellbore isolation devices or components, and the like associated with the wellbore 116. The treatment fluid may also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the treatment fluid may also directly or indirectly affect any transport or delivery equipment used to convey the treatment fluid to the drilling assembly 100 such as, for example, any transport vessels, conduits, pipelines, trucks, tubulars, and/or pipes used to fluidically move the treatment fluid from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

The present invention provides for the following exemplary embodiments, the numbering of which is not to be construed as designating levels of importance:

Embodiment 1 relates to a method comprising:
obtaining or providing a treatment fluid comprising a compound of the unit formula (I):

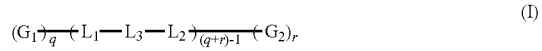

(I)

wherein:
$G_1$ and $G_2$ are each, independently, polysaccharides;
$L_1$ and $L_2$ are each, independently, linking groups;
$L_3$ is a linking group that is different than $L_1$ and $L_2$; and q and r are each, independently, an integer from 1 to 5000; and placing the treatment fluid in a subterranean formation.

Embodiment 2 relates to the method of Embodiment 1, wherein q and r are each 1.

Embodiment 3 relates to the method of Embodiments 1-2, wherein $G_1$ is alginate, chitosan, curdlan, dextran, emulsan, a galactoglucopolysaccharide, gellan, glucuronan, N-acetyl-heparosan, hyaluronic acid, indicant, kefiran, lentinan, levan, mauran, pullulan, scleroglucan, schizophyllan, stewartan, succinoglycan, xanthan gum, xylane, welan, starch, tamarind, tragacanth, guar gum, derivatized guar, gum ghatti, gum arabic, locust bean gum, diutan gum, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, carboxymethyl hydroxylpropyl guar or combinations thereof.

Embodiment 4 relates to the method of Embodiments 1-3, wherein $G_2$ is alginate, chitosan, curdlan, dextran, emulsan, a galactoglucopolysaccharide, gellan, glucuronan, N-acetyl-heparosan, hyaluronic acid, indicant, kefiran, lentinan, levan, mauran, pullulan, scleroglucan, schizophyllan, stewartan, succinoglycan, xanthan gum, xylane, welan, starch, tamarind, tragacanth, guar gum, derivatized guar, gum ghatti, gum arabic, locust bean gum, diutan gum, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, carboxymethyl hydroxylpropyl guar or combinations thereof.

Embodiment 5 relates to the method of Embodiments 1-4, wherein $G_1$ and $G_2$ are each, independently, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose or combinations thereof.

Embodiment 6 relates to the method of Embodiments 1-5, wherein $G_1$ and $G_2$ are each, independently, hydroxyethylcellulose or carboxymethyl cellulose.

Embodiment 7 relates to the method of Embodiments 1-6, wherein $L_1$ is an optionally substituted $C_1$-$C_{20}$ hydrocarbylene group, optionally interrupted by one or more atoms selected from the group consisting of O, $SO_x$ (wherein x is 0, 1 or 2), NH, N or combinations thereof.

Embodiment 8 relates to the method of Embodiment 5, wherein $L_1$ is an optionally substituted $C_3$-$C_{10}$ hydrocarbylene group, optionally interrupted by one or more atoms selected from the group consisting of O, $SO_x$ (wherein x is 0, 1 or 2), NH, N or combinations thereof.

Embodiment 9 relates to the method of Embodiment 5, wherein $L_1$ is an optionally substituted $C_3$-$C_8$ hydrocarbylene group, optionally interrupted by one or more atoms selected from the group consisting of O, $SO_x$ (wherein x is 0, 1 or 2), NH, N or combinations thereof.

Embodiment 10 relates to the method of Embodiment 5, wherein $L_1$ comprises an optionally substituted $C_2$-$C_8$ alkylene group, optionally interrupted by one or more atoms selected from the group consisting of O, $SO_x$ (wherein x is 0, 1 or 2), NH, N or combinations thereof; an optionally substituted $C_3$-$C_8$ arylene group, optionally interrupted by one or more atoms selected from the group consisting of O, $SO_x$ (wherein x is 0, 1 or 2), NH, N or combinations thereof; or an optionally substituted $C_3$-$C_8$ heterocyclyl group, optionally interrupted by one or more atoms selected from the group consisting of O, $SO_x$ (wherein x is 0, 1 or 2), NH, N or combinations thereof.

Embodiment 11 relates to the method of Embodiment 10, wherein the optionally substituted $C_3$-$C_8$ arylene group comprises an optionally substituted arylene-$SO_x$-group, wherein x is 0, 1 or 2.

Embodiment 12 relates to the method of Embodiment 11, wherein the optionally substituted arylene-$SO_x$-group has the formula:

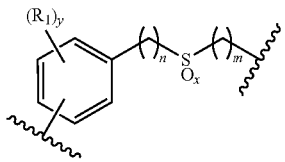

wherein $R_1$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; y is 0, 1 or 2; x is 0, 1 or 2; n is an integer from 1 to 10; and m is an integer from 1 to 10.

Embodiment 13 relates to the method of Embodiment 12, wherein $R_1$ is haloalkyl or perhaloalkyl.

Embodiment 14 relates to the method of Embodiment 13, wherein $R_1$ is fluoroalkyl or perfluoroalkyl.

Embodiment 15 relates to the method of Embodiment 10, wherein the optionally substituted $C_3$-$C_8$ heterocyclyl group comprises an optionally substituted $C_3$-$C_8$ heterocyclyl group comprising one, two or three nitrogen atoms.

Embodiment 16 relates to the method of Embodiment 10, wherein the optionally substituted $C_3$-$C_8$ heterocyclyl group comprises an optionally substituted $C_3$-$C_8$ heterocyclyl group comprising three nitrogen atoms.

Embodiment 17 relates to the method of Embodiment 16, wherein the optionally substituted $C_3$-$C_8$ heterocyclyl group comprising three nitrogen atoms has the formula:

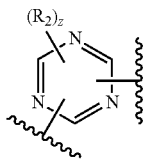

wherein $R_2$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; and z is 0, 1 or 2.

Embodiment 18 relates to the method of Embodiment 17, wherein $R_2$ is nitrile or nitro.

Embodiment 19 relates to the method of Embodiments 1-18, wherein $L_1$ comprises a curable resin.

Embodiment 20 relates to the method of Embodiment 19, wherein $L_1$ is a photocurable resin.

Embodiment 21 relates to the method of Embodiment 20, wherein the photocurable resin comprises an acrylated epoxy resin, an acrylated polyurethane and acrylated polyester or combinations thereof.

Embodiment 22 relates to the method of Embodiments 1-21, wherein $L_2$ is an optionally substituted $C_1$-$C_{20}$ hydrocarbylene group, optionally interrupted by one or more atoms selected from the group consisting of O, $SO_x$ (wherein x is 0, 1 or 2), NH, N or combinations thereof.

Embodiment 23 relates to the method of Embodiment 22, wherein $L_2$ is an optionally substituted $C_3$-$C_{10}$ hydrocarbylene group, optionally interrupted by one or more atoms selected from the group consisting of O, $SO_x$ (wherein x is 0, 1 or 2), NH, N or combinations thereof.

Embodiment 24 relates to the method of Embodiment 22, wherein $L_2$ is an optionally substituted $C_3$-$C_8$ hydrocarbylene group, optionally interrupted by one or more atoms selected from the group consisting of O, $SO_x$ (wherein x is 0, 1 or 2), NH, N or combinations thereof.

Embodiment 25 relates to the method of Embodiment 22, wherein $L_2$ comprises an optionally substituted $C_2$-$C_8$ alkylene group, optionally interrupted by one or more atoms selected from the group consisting of O, $SO_x$ (wherein x is 0, 1 or 2), NH, N or combinations thereof; an optionally substituted $C_3$-$C_8$ arylene group, optionally interrupted by one or more atoms selected from the group consisting of O, $SO_x$ (wherein x is 0, 1 or 2), NH, N or combinations thereof; or an optionally substituted $C_3$-$C_8$ heterocyclyl group, optionally interrupted by one or more atoms selected from the group consisting of O, $SO_x$ (wherein x is 0, 1 or 2), NH, N or combinations thereof.

Embodiment 26 relates to the method of Embodiment 25, wherein the optionally substituted $C_3$-$C_8$ arylene group comprises an arylene-$SO_x$-group, wherein X is 0, 1 or 2.

Embodiment 27 relates to the method of Embodiment 26, wherein the aryl-$SO_x$-group has the formula:

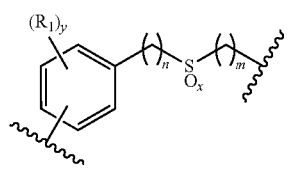

wherein $R_1$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; y is 0, 1 or 2; x is 0, 1 or 2; n is an integer from 1 to 10; and m is an integer from 1 to 10.

Embodiment 28 relates to the method of Embodiment 27, wherein $R_1$ is haloalkyl or perhaloalkyl.

Embodiment 29 relates to the method of Embodiment 28, wherein $R_1$ is fluoroalkyl or perfluoroalkyl.

Embodiment 30 relates to the method of Embodiment 25, wherein the optionally substituted $C_3$-$C_8$ heterocyclyl group comprises a $C_3$-$C_8$ heterocyclyl group comprising one, two or three nitrogen atoms.

Embodiment 31 relates to the method of Embodiment 25, wherein the optionally substituted $C_3$-$C_8$ heterocyclyl group comprises a $C_3$-$C_8$ heterocyclyl group comprising three nitrogen atoms.

Embodiment 32 relates to the method of Embodiment 29, wherein the optionally substituted $C_3$-$C_8$ heterocyclyl group comprising three nitrogen atoms has the formula:

[Structure: pyrazine/pyrimidine ring with (R$_2$)$_z$ substituents]

wherein R$_2$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; and z is 0, 1 or 2.

Embodiment 33 relates to the method of Embodiment 32, wherein R$_2$ is nitrile or nitro.

Embodiment 34 relates to the method of Embodiments 1-33, wherein L$_2$ comprises a curable resin.

Embodiment 35 relates to the method of Embodiment 34, wherein L$_2$ comprises a photocurable resin.

Embodiment 36 relates to the method of Embodiment 35, wherein the photocurable resin comprises an acrylated epoxy resin, an acrylated polyurethane and acrylated polyester or combinations thereof.

Embodiment 37 relates to the method of Embodiment 1, wherein L$_1$ and L$_2$ are each:

[Structure: phenyl ring with (R$_1$)$_y$ substituents, linked via $-(\,)_n-S(O_x)-(\,)_m-$]

wherein each R$_1$ is, independently, a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; each y is, independently, 0, 1 or 2; each x is, independently, is 0, 1 or 2; each n is, independently, an integer from 1 to 10; and each m is, independently, an integer from 1 to 10.

Embodiment 38 relates to the method of Embodiment 37, wherein R$_1$ is haloalkyl or perhaloalkyl.

Embodiment 39 relates to the method of Embodiment 38, wherein R$_1$ is fluoroalkyl or perfluoroalkyl.

Embodiment 40 relates to the method of Embodiment 1, wherein L$_1$ and L$_2$ are each:

[Structure: pyrazine/pyrimidine ring with (R$_2$)$_z$ substituents]

wherein each R$_2$ is, independently, a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; and each z is, independently, 0, 1 or 2.

Embodiment 41 relates to the method of Embodiment 40, wherein R$_2$ is nitrile or nitro.

Embodiment 42 relates to the method of Embodiments 1-41, wherein L$_3$ is a C$_{10}$-C$_{500}$ hydrocarbylene group optionally interrupted by one or more atoms selected from the group consisting of O, SO$_x$ (wherein x is 0, 1 or 2), NH, or combinations thereof, and wherein the C$_{10}$-C$_{500}$ hydrocarbylene group is optionally substituted.

Embodiment 43 relates to the method of Embodiment 42, wherein L$_3$ is a C$_{10}$-C$_{500}$ hydrocarbylene group optionally interrupted by one or more O atoms and wherein the C$_{10}$-C$_{500}$ hydrocarbylene group is optionally substituted.

Embodiment 44 relates to the method of one of Embodiments 6, 37, 40, and 42, wherein L$_3$ is a C$_{10}$-hydrocarbylene group optionally interrupted by one or more O atoms and wherein the C$_{10}$-hydrocarbylene group is optionally substituted.

Embodiment 45 relates to the method of one of Embodiments 6, 37, 40, and 42, wherein L$_3$ is:

[Structure: $-O-(CH_2CH_2O)_d-$]

wherein d is an integer from 5 to 250.

Embodiment 46 relates to the method of Embodiments 1-45, wherein the treatment fluid comprises a drilling fluid, stimulation fluid, clean-up fluid, fracturing fluid, spotting fluid, production fluid, completion fluid, remedial treatment fluid, abandonment fluid, acidizing fluid, cementing fluid, a fluid control material, a packing fluid or combinations thereof.

Embodiment 47 relates to the method of Embodiments 1-45, wherein the treatment fluid reduces the permeability of a subterranean formation to the flow of fluids through a portion of a subterranean formation.

Embodiment 48 relates to the method of Embodiment 47, wherein the treatment fluid comprises water.

Embodiment 49 relates to the method of Embodiments 1-48, wherein the treatment fluid has a viscosity that is sufficiently high for it to be used as a fluid control material.

Embodiment 50 relates to the method of Embodiments 1-49, wherein the compound of formula (I) exhibits pseudoplastic rheology.

Embodiment 51 relates to the method of Embodiments 1-50, wherein the treatment fluid exhibits pseudoplastic rheology.

Embodiment 52 relates to a method comprising:

placing a treatment fluid comprising:

a compound of the formula (I):

$$(G_1)_{\overline{q}}(L_1-L_3-L_2)_{\overline{(q+r)-1}}(G_2)_r \quad (I)$$

wherein:

G$_1$ and G$_2$ are each, independently, polysaccharides;

L$_1$ and L$_2$ are each, independently, linking groups;

L$_3$ is a linking group that is different than L$_1$ and L$_2$; and q and r are each, independently, an integer from 1 to 5000;

in a subterranean formation.

Embodiment 53 relates to a method comprising:
coating a surface with a composition comprising:

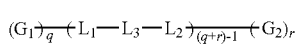 (I)

wherein:
G$_1$ and G$_2$ are each, independently, polysaccharides;
L$_1$ and L$_2$ are each, independently, curable resins;
L$_3$ is a linking group that is different than L$_1$ and L$_2$; and
q and r are each, independently, an integer from 1 to 5000; and
curing the curable resins.

Embodiment 54 relates to the method of Embodiment 53, wherein the curable resin comprises a photocurable resin and the curing comprises curing with ultraviolet light.

Embodiment 55 relates to the method of Embodiment 54, wherein the photocurable resin comprises an acrylated epoxy resin, an acrylated polyurethane and acrylated polyester or combinations thereof.

Embodiment 56 relates to a system comprising:
a treatment fluid comprising:
a compound of the formula (I):

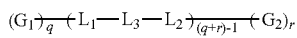 (I)

wherein:
G$_1$ and G$_2$ are each, independently, polysaccharides;
L$_1$ and L$_2$ are each, independently, linking groups;
L$_3$ is a linking group that is different than L$_1$ and L$_2$; and
q and r are each, independently, an integer from 1 to 5000; and
a subterranean formation comprising the treatment fluid.

Embodiment 57 relates to a treatment fluid for treating a subterranean formation, the treatment fluid comprising:
a compound of the formula (I):

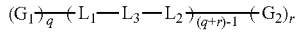 (I)

wherein:
G$_1$ and G$_2$ are each, independently, polysaccharides;
q and r are each, independently, an integer from 1 to 5000; and
L$_1$ and L$_2$ are each, independently, linking groups of the formula

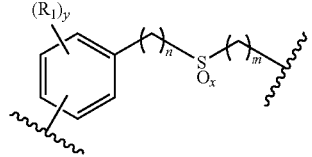

wherein each R$_1$ is, independently, a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; each y is, independently, 0, 1 or 2; each x is, independently, is 0, 1 or 2; each n is, independently, an integer from 1 to 10; and each m is, independently, an integer from 1 to 10, or

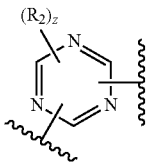

wherein each R$_2$ is, independently, a substituent selected from the group consisting of alkyl, alkenyl, alkynyl, aryl, halogen, hydroxyl, alkoxy, aryloxy, aralkyloxy, carboxyl (e.g., carboxylic acids, carboxylates, and carboxylate esters), thiol, alkyl and aryl sulfides, amino, nitrile, and nitro; and each z is, independently, 0, 1 or 2;
L$_3$ is a linking group of the formula

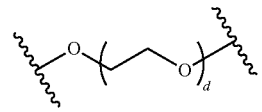

wherein d is an integer from 5 to 250.

Embodiment 58 relates to the method of Embodiment 57, wherein wherein R$_1$ is haloalkyl or perhaloalkyl.

Embodiment 59 relates to the method of Embodiment 58, wherein R$_1$ is fluoroalkyl or perfluoroalkyl.

Embodiment 60 relates to the method of Embodiment 57, wherein R$_2$ is nitrile or nitro.

Embodiment 61 relates to the method of Embodiment 57, wherein L$_1$ and L$_2$ are each, independently, linking groups of the formula:

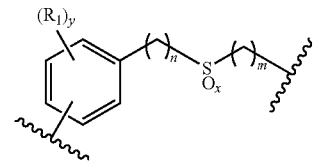

Embodiment 62 relates to the method of Embodiment 57, wherein L$_1$ and L$_2$ are each, independently, linking groups of the formula:

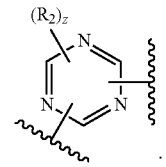

Embodiment 63 relates to the method of one of Embodiments 61 and 62, wherein G$_1$ and G$_2$ are each, independently, cellulose, hydroxyethylcellulose, hemicellulose, carboxymethyl cellulose, hydroxyethyl cellulose, carboxymethyl hydroxyethyl cellulose, hydroxypropyl cellulose, methyl hydroxyl ethyl cellulose or combinations thereof.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

What is claimed is:

1. A method comprising:
placing a treatment fluid into a wellbore in a subterranean formation, wherein the treatment fluid comprises a compound of the unit formula (I):

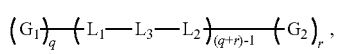

wherein:
$G_1$ and $G_2$ are each, independently, polysaccharides;
$L_1$ and $L_2$ are each, independently, linking groups;
$L_3$ is a linking group that is different than $L_1$ and $L_2$;
q and r are each, independently, an integer from 1 to 5,000; and
the compound of formula (I) is in an amount of about 0.01 wt % to about 5 wt % of the treatment fluid; and
performing a drilling operation after placing the treatment fluid in the wellbore.

2. The method of claim 1, wherein q and r are each 1.

3. The method of claim 1, wherein $G_1$ or $G_2$ is alginate, chitosan, curdlan, dextran, emulsan, a galactoglucopolysaccharide, gellan, glucuronan, N-acetyl-heparosan, hyaluronic acid, indicant, kefiran, lentinan, levan, mauran, pullulan, scleroglucan, schizophyllan, stewartan, succinoglycan, xanthan gum, xylane, welan, starch, tamarind, tragacanth, guar gum, derivatized guar, gum ghatti, gum arabic, locust bean gum, diutan gum, cellulose, hemicellulose, carboxymethyl cellulose, hydroxyethyl cellulose, carboxymethyl hydroxyethyl cellulose, hydroxypropyl cellulose, methyl hydroxyethyl cellulose, guar, hydroxypropyl guar, carboxymethyl guar, carboxymethyl hydroxypropyl guar or combinations thereof.

4. The method of claim 1, wherein $G_1$ and $G_2$ are each, independently, cellulose, hemicellulose, carboxymethyl cellulose, hydroxyethyl cellulose, carboxymethyl hydroxyethyl cellulose, hydroxypropyl cellulose, methyl hydroxyethyl cellulose, or combinations thereof.

5. The method of claim 1, wherein $L_1$ comprises an optionally substituted $C_3$-$C_8$ arylene group, optionally interrupted by one or more atoms selected from the group consisting of O, $SO_x$ (wherein x is 0, 1, or 2), NH, N, and combinations thereof.

6. The method of claim 1, wherein $L_1$ is an optionally substituted arylene-$SO_x$-group having the formula:

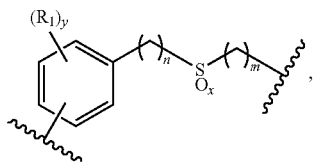

wherein $R_1$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; y is 0, 1, or 2; x is 0, 1, or 2; n is an integer from 1 to 10; and m is an integer from 1 to 10.

7. The method of claim 6, wherein $R_1$ is haloalkyl or perhaloalkyl.

8. The method of claim 1, wherein $L_2$ comprises an optionally substituted $C_3$-$C_8$ arylene group, optionally interrupted by one or more atoms selected from the group consisting of O, $SO_x$ (wherein x is 0, 1, or 2), NH, N, and combinations thereof.

9. The method of claim 1, wherein L2 is an optionally substituted aryl-$SO_x$-group having the formula:

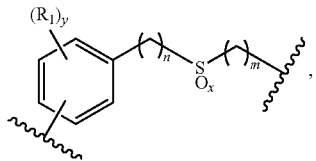

wherein $R_1$ is a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; y is 0, 1, or 2; x is 0, 1, or 2; n is an integer from 1 to 10; and m is an integer from 1 to 10.

10. The method of claim 9, wherein $R_1$ is haloalkyl or perhaloalkyl.

11. The method of claim 1, wherein $L_1$ and $L_2$ are each:

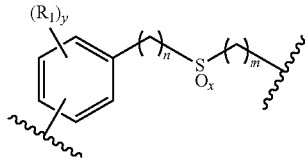

wherein each $R_1$ is, independently, a substituent selected from the group consisting of alkyl, alkenyl, alkynyl, aryl, halogen, hydroxyl, alkoxy, aryloxy, aralkyloxy, carboxyl, thiol, alkyl and aryl sulfides, amino, nitrile, and nitro; each y is, independently, 0, 1 or 2; each x is, independently, is 0, 1 or 2; each n is, independently, an integer from 1 to 10; and each m is, independently, an integer from 1 to 10.

12. The method of claim 11, wherein $R_1$ is haloalkyl or perhaloalkyl.

13. The method of claim 1, wherein $L_3$ is a $C_{10}$-$C_{500}$ hydrocarbylene group optionally interrupted by one or more O atoms and wherein the $C_{10}$-$C_{500}$ hydrocarbylene group is optionally substituted.

14. The method of claim 13, wherein $L_3$ is a $C_{10}$-hydrocarbylene group optionally interrupted by one or more O atoms, and wherein the $C_{10}$-hydrocarbylene group is optionally substituted.

15. The method of claim 1, wherein the treatment fluid comprises a drilling fluid, stimulation fluid, clean-up fluid, fracturing fluid, spotting fluid, production fluid, completion fluid, remedial treatment fluid, abandonment fluid, acidizing fluid, cementing fluid, a fluid control material, a packing fluid, or combinations thereof.

16. The method of claim 1, wherein the compound of formula (I) and/or the treatment fluid exhibits pseudoplastic rheology.

17. A method comprising:
placing a treatment fluid into a wellbore in a subterranean formation, wherein the treatment fluid comprises:
a compound of the formula (I):

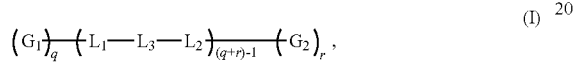

wherein:
$G_1$ and $G_2$ are each, independently, polysaccharides;
$L_1$ and $L_2$ are each, independently, linking groups;
$L_3$ is a linking group that is different than $L_1$ and $L_2$;
q and r are each, independently, an integer from 1 to 5,000; and
the compound of formula (I) is in an amount of about 0.01 wt % to about 5 wt % of the treatment fluid.

18. The method of claim 1, wherein the treatment fluid further comprises a slurry or a mud.

19. The method of claim 1, wherein the treatment fluid further comprises a proppant.

20. The method of claim 1, wherein the compound of formula (I) is in an amount of about 0.1 wt % to about 3 wt % of in the treatment fluid.

21. A method comprising:
placing a treatment fluid into a wellbore in a subterranean formation, wherein the treatment fluid comprises a proppant and a compound of the unit formula (I):

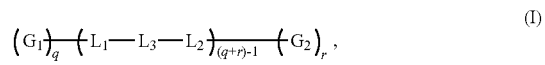

wherein:
$G_1$ and $G_2$ are each, independently, polysaccharides;
$L_1$ and $L_2$ are each, independently, linking groups;
$L_3$ is a linking group that is different than $L_1$ and $L_2$;
q and r are each, independently, an integer from 1 to 5,000; and
the compound of formula (I) is in an amount of about 0.01 wt % to about 5 wt % of the treatment fluid; and
hydraulically fracturing with the treatment fluid to produce fractures in the subterranean formation.

22. The method of claim 21, wherein the compound of formula (I) is in an amount of about 0.1 wt % to about 3 wt % of in the treatment fluid.

* * * * *